(12) United States Patent
Brattoli et al.

(10) Patent No.: US 10,175,080 B2
(45) Date of Patent: Jan. 8, 2019

(54) SYSTEM AND METHOD FOR INDICATING AN EFFICIENCY OF A FLUID MOVEMENT SYSTEM

(71) Applicant: Regal Beloit America, Inc., Beloit, WI (US)

(72) Inventors: Mark A. Brattoli, Fort Wayne, IN (US); Brian L. Beifus, Fort Wayne, IN (US); Roger C. Becerra, Fort Wayne, IN (US); Marc McKinzie, West Milton, OH (US); Joshua T. Doseck, Tipp City, OH (US); John Sheldon Wagley, Winona Lake, IN (US)

(73) Assignee: Regal Beloit America, Inc., Beloit, WI (US)

( * ) Notice: Subject to any disclaimer, the term of this patent is extended or adjusted under 35 U.S.C. 154(b) by 1006 days.

(21) Appl. No.: 14/531,577

(22) Filed: Nov. 3, 2014

(65) Prior Publication Data
US 2016/0123784 A1    May 5, 2016

(51) Int. Cl.
*G01F 9/00*    (2006.01)
*F24F 11/39*    (2018.01)

(52) U.S. Cl.
CPC ............ *G01F 9/001* (2013.01); *F24F 11/39* (2018.01)

(58) Field of Classification Search
CPC ............ F02D 41/0045; F02D 41/0072; G01M 15/042
See application file for complete search history.

(56) References Cited

U.S. PATENT DOCUMENTS

| | | | |
|---|---|---|---|
| 4,217,761 A | 8/1980 | Cornaire et al. | |
| 4,806,833 A | 2/1989 | Young | |
| 5,019,757 A | 5/1991 | Beifus | |
| 6,369,544 B1 | 4/2002 | Kadah | |
| 6,505,502 B1 | 1/2003 | Brownell et al. | |
| 6,588,222 B1 | 7/2003 | Urbank et al. | |
| 8,032,767 B2 | 10/2011 | Belady et al. | |
| 8,155,922 B2 | 4/2012 | Loucks | |
| 8,242,926 B2 | 8/2012 | Byers et al. | |
| 8,332,075 B2 | 12/2012 | Harrod et al. | |
| 2005/0137893 A1* | 6/2005 | Whitman, Jr. | G06Q 10/10 379/265.03 |
| 2006/0191275 A1 | 8/2006 | Jung et al. | |
| 2009/0099724 A1* | 4/2009 | Kranz | G01F 1/115 701/33.4 |

OTHER PUBLICATIONS

Becerra et al., "Airflow Regulation in Variable-Speed Systems for Residential HVAC Applications", ASHRAE Trans., 1996, Paper 3932; 8 pages, vol. 102, Part 1.

* cited by examiner

*Primary Examiner* — Elias Desta
(74) *Attorney, Agent, or Firm* — Armstrong Teasdale LLP

(57) ABSTRACT

A motor controller is provided. The motor controller is coupled to an efficiency indicator device and to a motor that is coupled to a fluid movement device. The motor controller includes a processor. The motor controller is configured to determine a fluid flow amount representing an amount of fluid moved by the fluid movement device during a predefined time period. Additionally, the motor controller is configured to determine a power usage amount representing an amount of power used by at least the fluid movement device and the motor in association with the fluid flow amount, generate an efficiency report associated with at least the fluid flow amount and the power usage amount, and transmit the efficiency report to the efficiency indicator device for presentation thereon.

20 Claims, 6 Drawing Sheets

SYSTEM AND METHOD FOR INDICATING AN EFFICIENCY OF A FLUID MOVEMENT SYSTEM

BACKGROUND

The field of the disclosure relates generally to determining an efficiency of a fluid movement system, and more particularly, to systems and methods that indicate the efficiency of a fluid movement system.

For at least some known fluid movement systems, such as a system that moves air for a heating, ventilation, and air conditioning (HVAC) system or a system that moves water in an aquatic environment such as a pool or spa, a technician or manufacturer must use specialized equipment, for example in a laboratory, to determine the efficiency of the fluid movement system. Over time, the efficiency of the fluid movement system may change, for example as a filter becomes clogged with debris and/or due to changes in the configuration of an inlet or outlet. Accordingly, it would be beneficial to be able to identify the efficiency of a fluid movement system in the field and determine how changes to the configuration of the fluid movement system, as installed, affect its efficiency.

BRIEF DESCRIPTION

In one aspect, a motor controller is provided. The motor controller is coupled to an efficiency indicator device and to a motor that is coupled to a fluid movement device. The motor controller includes a processor. The motor controller is configured to determine a fluid flow amount representing an amount of fluid moved by the fluid movement device during a predefined time period. Additionally, the motor controller is configured to determine a power usage amount representing an amount of power used by at least the fluid movement device and the motor in association with the fluid flow amount, generate an efficiency report associated with at least the fluid flow amount and the power usage amount, and transmit the efficiency report to the efficiency indicator device for presentation thereon.

In another aspect, a method for indicating an efficiency of a fluid movement system is provided. The fluid movement system includes a motor controller coupled to an efficiency indicator device and to a motor. The motor is coupled to a fluid movement device. The method is implemented by the motor controller. The method includes determining, by the motor controller, a fluid flow amount representing an amount of fluid moved by the fluid movement device during a predefined time period. The method additionally includes determining, by the motor controller, a power usage amount representing an amount of power used by at least the fluid movement device and the motor in association with the fluid flow amount, generating, by the motor controller, an efficiency report associated with at least the fluid flow amount and the power usage amount, and transmitting, by the motor controller, the efficiency report to the efficiency indicator device for presentation thereon.

In another aspect, a computer-readable storage device having computer-executable instructions embodied thereon is provided. When executed by a motor controller coupled to an efficiency indicator device and to a motor that is coupled to a fluid movement device, the computer-executable instructions cause the motor controller to determine a fluid flow amount representing an amount of fluid moved by the fluid movement device during a predefined time period, determine a power usage amount representing an amount of power used by at least the fluid movement device and the motor in association with the fluid flow amount, generate an efficiency report associated with at least the fluid flow amount and the power usage amount, and transmit the efficiency report to the efficiency indicator device for presentation thereon.

DETAILED DESCRIPTION

Figure 1:
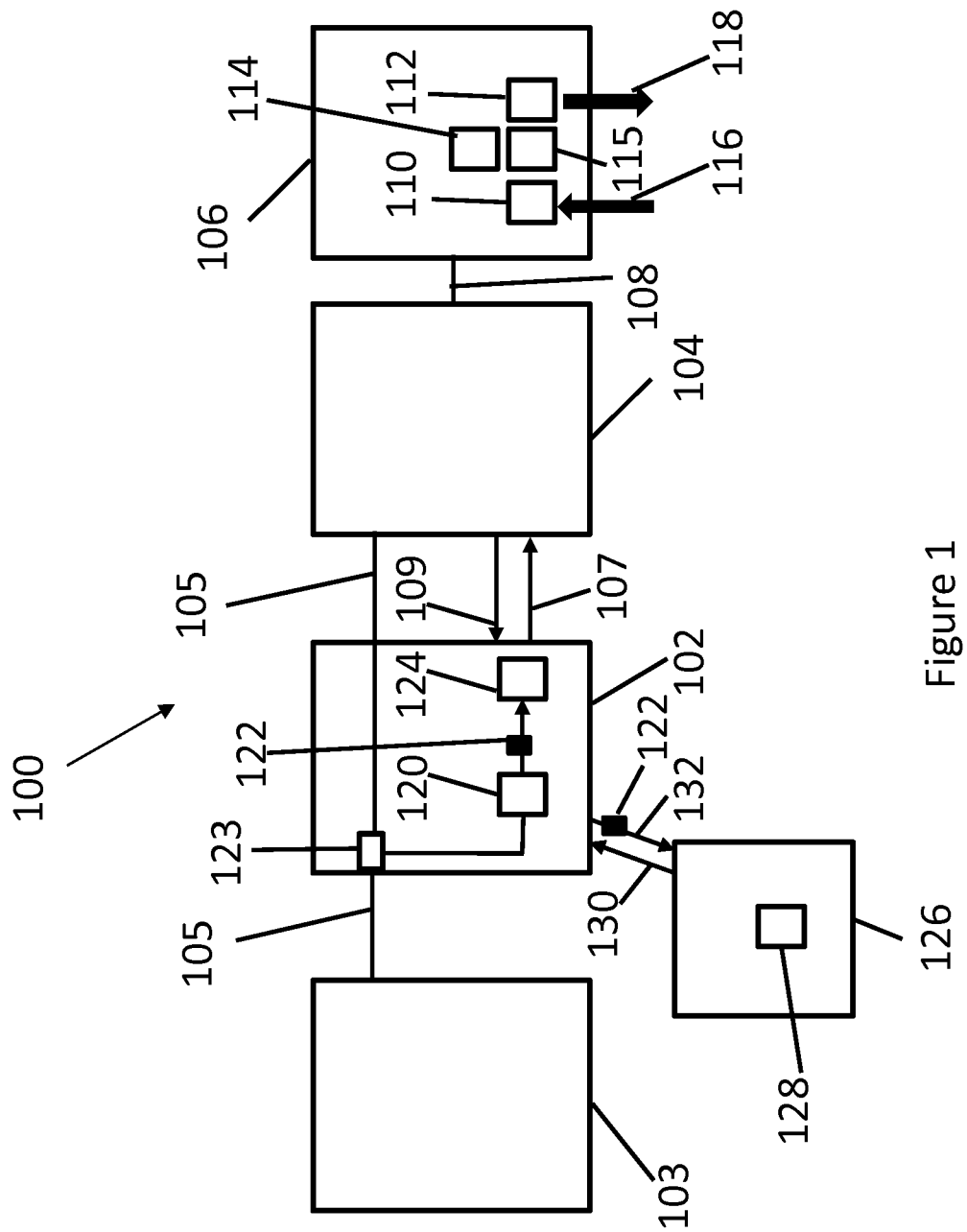
FIG. 1 is a block diagram of an example fluid movement system that includes a motor controller coupled to a motor that is coupled to a fluid movement device.

Implementations of the systems and methods described herein enable a fluid movement system to report information about the efficiency of the fluid movement system. For example in some implementations, the fluid movement system includes a motor controller coupled to a motor that is coupled to a fluid movement device, such as a fan or an impeller. The motor controller determines a fluid flow amount representing an amount of fluid moved by the fluid movement device during a predefined time period. For example, the fluid flow amount, in some implementations, is an amount of cubic feet per minute (CFM). In some implementations, the motor controller does not measure the amount of fluid moved by the fluid movement device during the predefined time period, but rather determines what the fluid flow amount is projected to be for the predefined time period, based on one or more operating values of the fluid movement system.

In addition, the motor controller determines a power usage amount representing an amount of power used by the fluid movement system in association with the fluid flow amount. For example, in some implementations, the motor controller determines the power usage amount based on a torque and a speed of the motor driving the fluid movement device to produce the fluid flow amount. Additionally, the motor controller generates an efficiency report associated with the fluid flow amount and the power usage amount. For example, in some implementations, the efficiency report includes a ratio of the fluid flow amount to the power usage amount (e.g., CFM per Watt). The motor controller transmits the efficiency report to an efficiency indicator device for presentation thereon. In some implementations, the efficiency indicator device is included in fluid movement system and includes, for example, a display screen and/or one or more lights. In some implementations, the efficiency indicator device is included in a client computing device communicatively coupled to the motor controller. In at least some implementations, the motor controller transmits the efficiency report while the motor and/or fluid movement device is operating.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

FIG. 1 is a block diagram of an example fluid movement system 100 that may be used, for example, in a heating, ventilation, and air conditioning (HVAC) system, a refrigeration system, or an aquatic system, such as a pool or spa. Fluid movement system 100 includes a motor controller 102 coupled to a motor 104. In some implementations, motor controller 102 is integrated into motor 104. Motor 104 is, for example, an electric motor. More specifically, in at least some implementations, motor 104 is an electronically commutated motor (ECM). A power source 103 transmits electrical power to motor controller 102 and motor 104 through a bus 105. Motor controller 102 transmits at least one command signal 107 to motor 104 to control operations of motor 104 and receives at least one feedback signal 109 from motor 104. For example, in some implementations, command signal 107 includes at least one of a set point for a speed or a torque of motor 104 and feedback signal 109 includes at least one of a current speed, a current torque of motor 104, and a current position of shaft 108. For example, in some implementations in which the position of shaft 108 is included in feedback signal 109, motor 104 is a stepper motor that drives a valve (not shown) for controlling fluid flow.

Motor 104 is coupled to a fluid movement device 106 by shaft 108. Fluid movement device 106 includes, for example, a fan, an impeller, and/or a valve. As motor 104 rotates shaft 108, fluid movement device 106 receives an input flow 116 of air, water, or other fluid through an inlet 110 and forces the fluid out, in an output flow 118, through an outlet 112. In at least some implementations, fluid movement device 106 includes one or more elements that cause resistance 114 to the movement of fluid through fluid movement device 106. For example, in at least some implementations, a filter 115 and/or a configuration of inlet 110 and/or outlet 112 affects resistance 114.

Motor controller 102 includes an efficiency determination computing device 120 that generates at least one efficiency report 122 relating to operations of fluid movement system 100, as described in more detail herein. In at least some implementations, efficiency determination computing device 120 is coupled to a first efficiency indicator device 124. In at least some implementations, efficiency determination computing device 120 is coupled to or includes a current sensor 123 that senses a current in bus 105. In some implementations, first efficiency indicator device 124 is included in motor controller 102. First efficiency indicator device 124 indicates, for example in a visual representation, information in efficiency report 122. Although efficiency determination computing device 120 is shown in FIG. 1 as being included in motor controller 102, efficiency indicator device 124, in at least some implementations, is included in another portion of fluid movement system 100.

In some implementations, a client computing device 126 (e.g., a smart phone, a tablet, or a diagnostic tool) is communicatively coupled to efficiency determination computing device 120, for example through a wired or wireless communication link. Client computing device 126 includes a second efficiency indicator device 128. In at least some implementations, client computing device 126 transmits a request signal 130 to efficiency determination computing device 120 and efficiency determination computing device 120 transmits an output signal 132 to client computing device 126 that includes efficiency report 122. Second efficiency indicator device 128 then indicates, for example in a visual representation, information in efficiency report 122.

Figure 2:
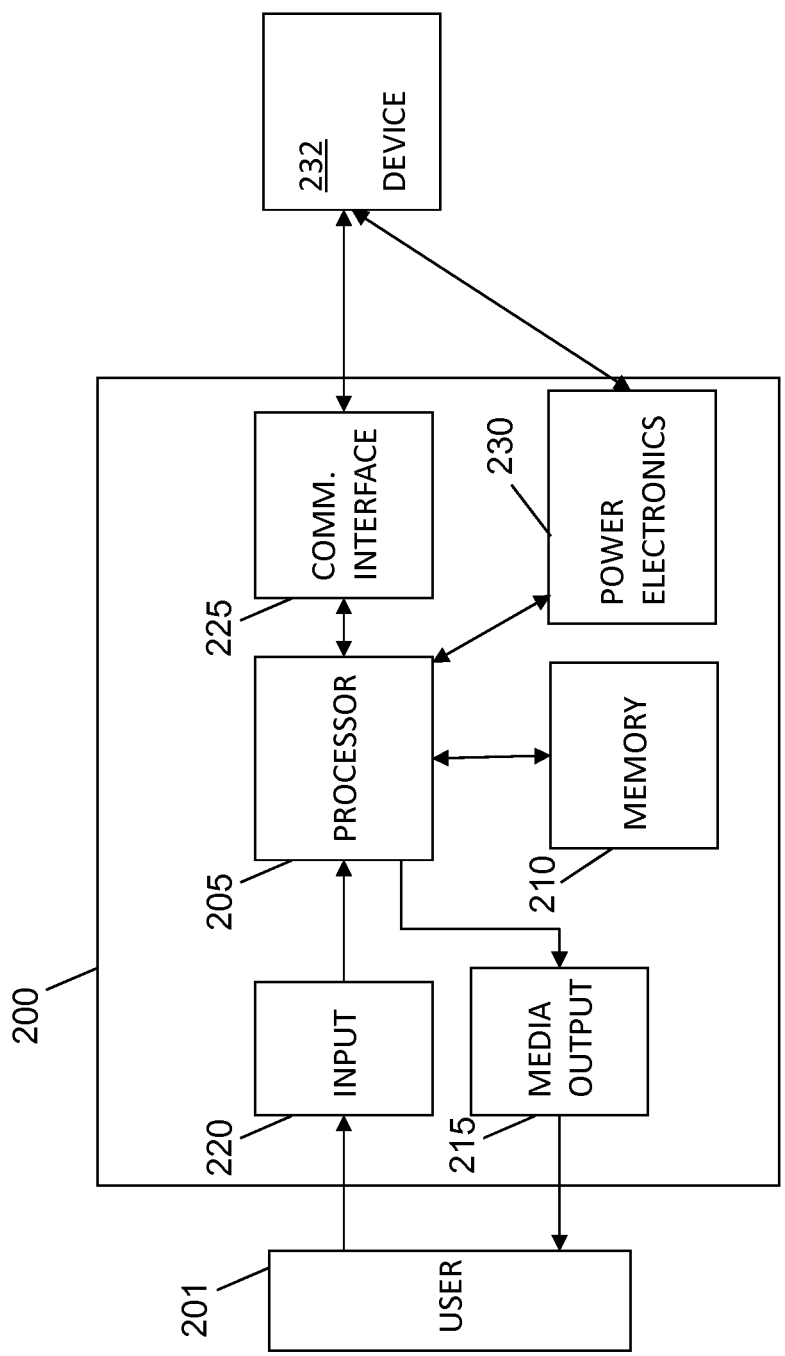
FIG. 2 is a block diagram of an example computing device included in the system of FIG. 1.

FIG. 2 is a block diagram of an example computing device 200. At least some components of computing device 200 are included in implementations of other devices describe herein, for example motor controller 102, efficiency determination computing device 120, and client computing device 126. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device (e.g., first efficiency indicator device 124 and/or second efficiency indicator device 128) such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220.

Computing device 200 may also include a communication interface 225, which is communicatively couplable to another device 232, for example motor 104 or another computing device. In some implementations, communication interface 225 is configured to enable communication through a short range wireless communication protocol such as near field communication (NFC), Bluetooth™, or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In some implementations, communication interface 225 includes, for example, one or more conductors for transmitting electrical signals and/or power to and/or from another device 232. Additionally, computing device 200 may also include power electronics 230 which may be coupled, for example, to processor 205 and motor 104.

Figure 3:
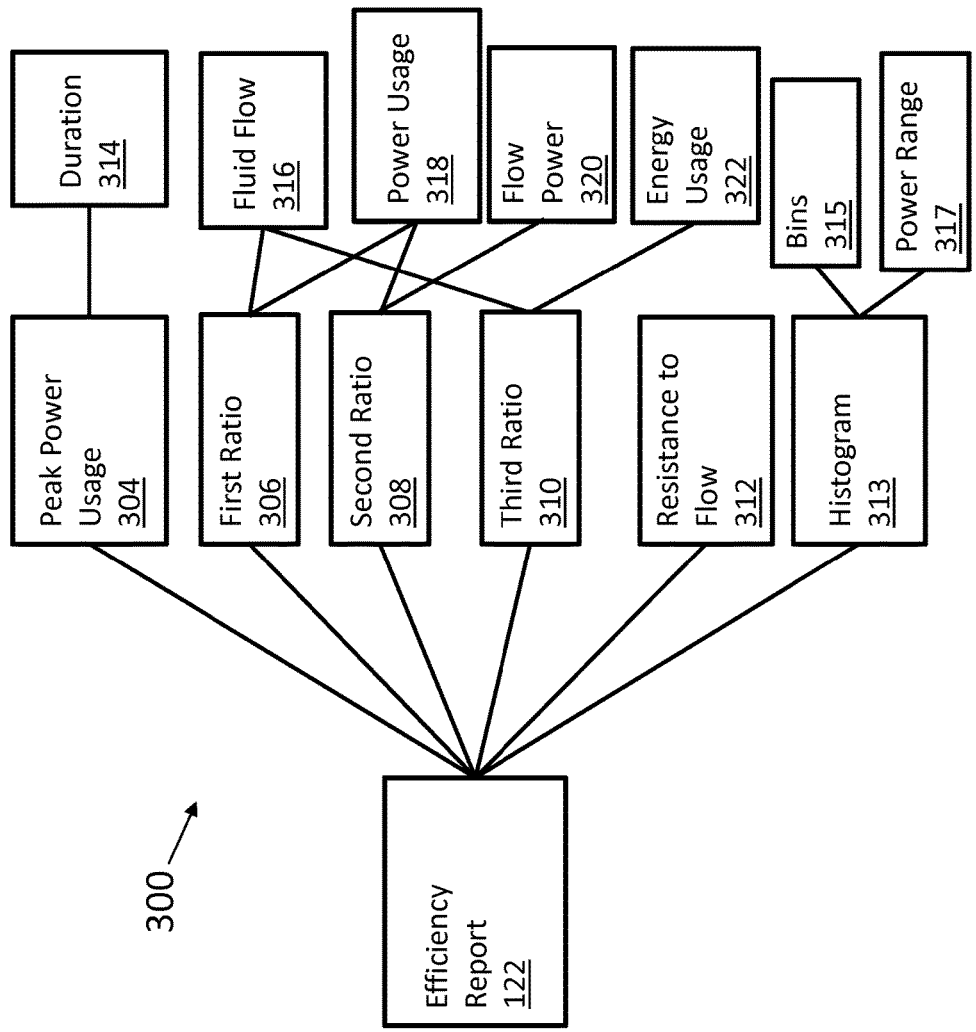
FIG. 3 is a block diagram of example contents of an efficiency report generated by the motor controller shown in FIG. 1.

FIG. 3 is a block diagram of example contents 300 of first efficiency report 122 generated by motor controller 102, and more specifically, by efficiency determination computing device 120. Efficiency report 122 includes one or more of a peak power usage 304, a first ratio 306, a second ratio 308, a third ratio 310, and a resistance to flow 312. More specifically, in at least some implementations, efficiency determination computing device 120 monitors amounts of power used by fluid movement system 100 and stores, in memory 210, a peak power usage 304. In at least some implementations, efficiency determination computing device 120 additionally monitors a duration 314 at which fluid movement system 100 operated at the peak power. As described above, in at least some implementations, efficiency determination computing device 120 includes peak power usage 304 in efficiency report 122. Additionally, in at least some implementations, efficiency determination computing device 120 includes duration 314 in efficiency report 122.

In at least some implementations, first ratio 306 is a ratio of a fluid flow amount 316 to a power usage amount 318. More specifically, efficiency determination computing device 120 determines fluid flow amount 316. In some implementations in which fluid movement system 100 is configured to provide a predefined fluid flow, efficiency determination computing device 120 retrieves fluid flow amount 316 from memory 210. In other implementations, efficiency determination computing device 120 stores at least one equation in memory 210 that defines fluid flow amount 316 as a function of operating values of motor 104 and/or fluid movement device 106. For example, in at least some implementations, efficiency determination computing device 120 determines fluid flow amount 316 by executing an equation that defines fluid flow amount 316 as a function of a speed and a torque of motor 104. In at least some implementations, efficiency determination computing device 120 calculates the torque based on a bus current (e.g., a current of bus 105).

Efficiency determination computing device 120 determines power usage amount 318. More specifically, in some implementations, efficiency determination computing device 120 determines power usage amount 318 by multiplying a voltage and a current of a bus, such as bus 105. In some implementations, efficiency determination computing device 120 determines power usage amount 318 by determining shaft power (e.g., power applied by motor 104 to shaft 108) according to Equation 1, wherein T is a torque of motor 104, N is a speed of motor 104, and $k_c$ is a conversion factor for units used to express the torque and the speed.

$$P_{shaft} = \frac{T \cdot N}{k_c} \quad \text{(Equation 1)}$$

In other implementations, efficiency determination computing device 120 determines power usage amount 318 using Equation 2, wherein T is a torque of motor 104, N is a speed of motor 104, $k_c$ is a conversion factor for units used to express the torque and the speed, and eff[T,N] is an efficiency value retrieved from a lookup table in memory 210, in which efficiency values are indexed by T (torque of motor 104) and N (speed of motor 104).

$$P_{input} = \frac{T \cdot N}{k_c \cdot eff[T, N]} \quad \text{(Equation 2)}$$

In some implementations, first ratio 306 is defined as cubic feet per minute (CFM) per Watt.

In at least some implementations, second ratio 308 is a ratio of fluid flow amount 316 to a flow power amount 320. In at least some implementations, efficiency determination computing device 120 determines fluid flow amount 316 by multiplying a pressure in output flow 118 by fluid flow amount 316. Efficiency determination computing device 120 determines the pressure in output flow 118 by executing an equation that defines the pressure as a function of the speed of motor 104 and the torque of motor 104.

In at least some implementations, third ratio 310 is a ratio of fluid flow amount 316 to an energy usage amount 322. In such implementations, efficiency determination computing device 120 determines energy usage amount 322 by multiplying power usage amount 318 by a period of time. In some implementations, efficiency determination computing device 120 expresses energy usage amount 322 as Watt-hours. Resistance to flow 312 pertains to resistance 114, described in relation to FIG. 1. In some implementations, efficiency determination computing device 120 determines resistance to flow 312 by dividing the pressure in output flow 118 by the square of fluid flow amount 316. In some implementations, efficiency report 122 includes a histogram 313 of energy usage that includes a plurality of bins 315 of time within a power range 317. In some implementations, efficiency report 122 includes an operating power (e.g., power usage 318), and motor controller 102 transmits efficiency report 122 to a utility, for example wirelessly or through a wired connection, for use in power shedding. For example, during power shedding, equipment, for example one or more fans and/or pumps, are deactivated or operated at a reduced power level.

Figure 4:
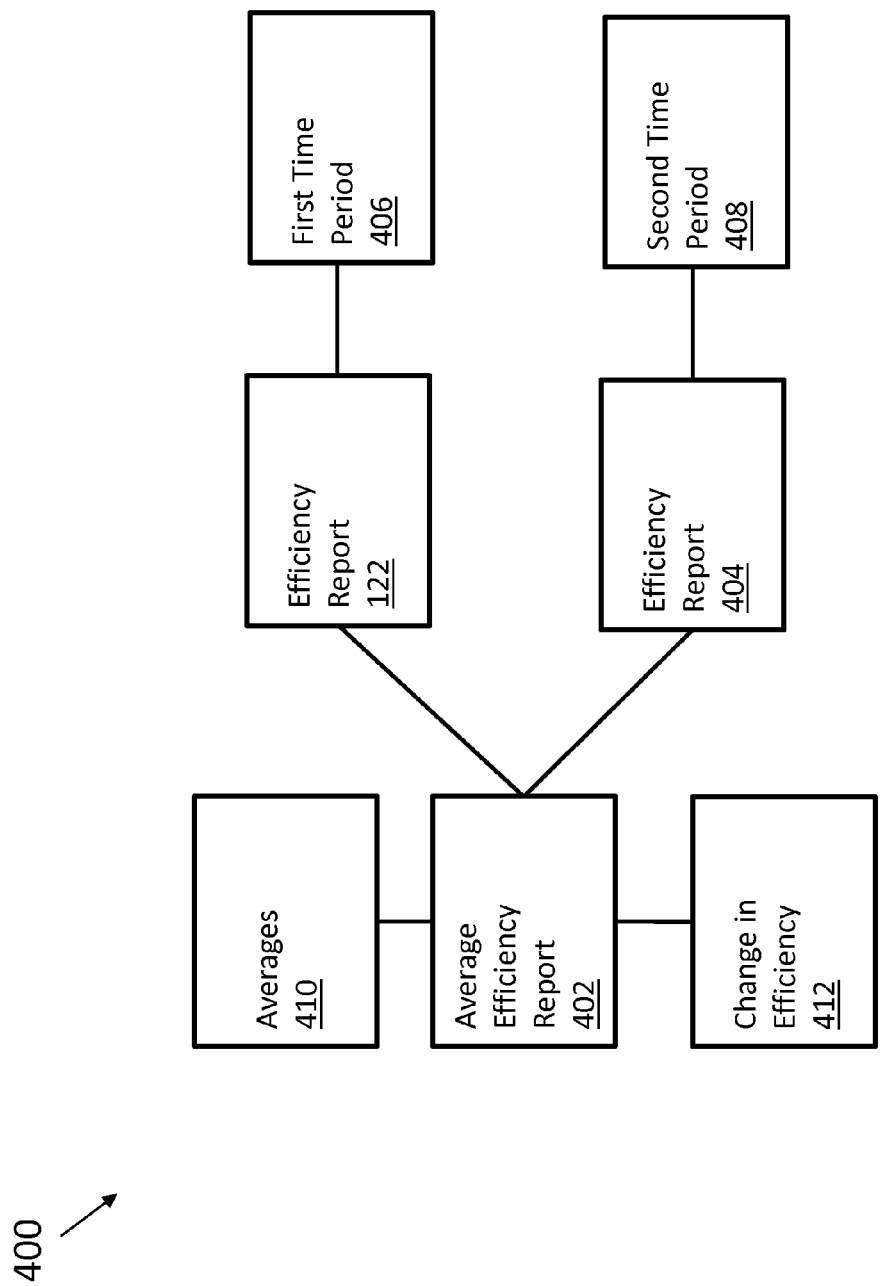
FIG. 4 is a block diagram of example contents of an average efficiency report generated by the motor controller shown in FIG. 1.

FIG. 4 is a block diagram of example contents 400 of an average efficiency report 402 generated by motor controller 102, and more specifically by efficiency determination computing device 120. Efficiency determination computing device 120 generates average efficiency report 402 based on a plurality of efficiency reports associated with different time periods. More specifically, in at least one implementation, efficiency determination computing device 120 generates average efficiency report 402 based on first efficiency report 122, generated at a first time period 406, and a second efficiency report 404 generated at a second time period 408 that is subsequent to the first time period. Second efficiency report 404 includes one or more of contents 300 (FIG. 3) for second time period 408. Efficiency determination computing device 120 averages contents 300 of the plurality of efficiency reports (e.g., first efficiency report 122 and second efficiency report 404) to generate averages 410. For example, averages 410 include one or more of an average ratio of fluid flow amount to power usage amount, an average ratio of fluid flow amount to flow power amount, an average ratio of fluid flow amount to energy usage amount, and an average resistance to flow. In some implementations, average efficiency report 402 additionally or alternatively includes the highest peak power usage 304 and duration 314 for all of the time periods (e.g., first time period 406 and second time period 408). In some implementations, efficiency determination computing device 120 determines a change in efficiency 412 by determining a difference in one or more of contents 300 of first efficiency report 122 to contents 300 of second efficiency report 404. In some implementations, average efficiency report 402 is based on more than two efficiency reports. Efficiency determination computing device 120 transmits average efficiency report 402 to at least one of first efficiency indicator device 124 and second efficiency indicator device 128 for presentation. In at least some implementations, change in efficiency 412 includes a message that maintenance should be performed on fluid movement system 100, such as replacing filter 115.

Figure 5:
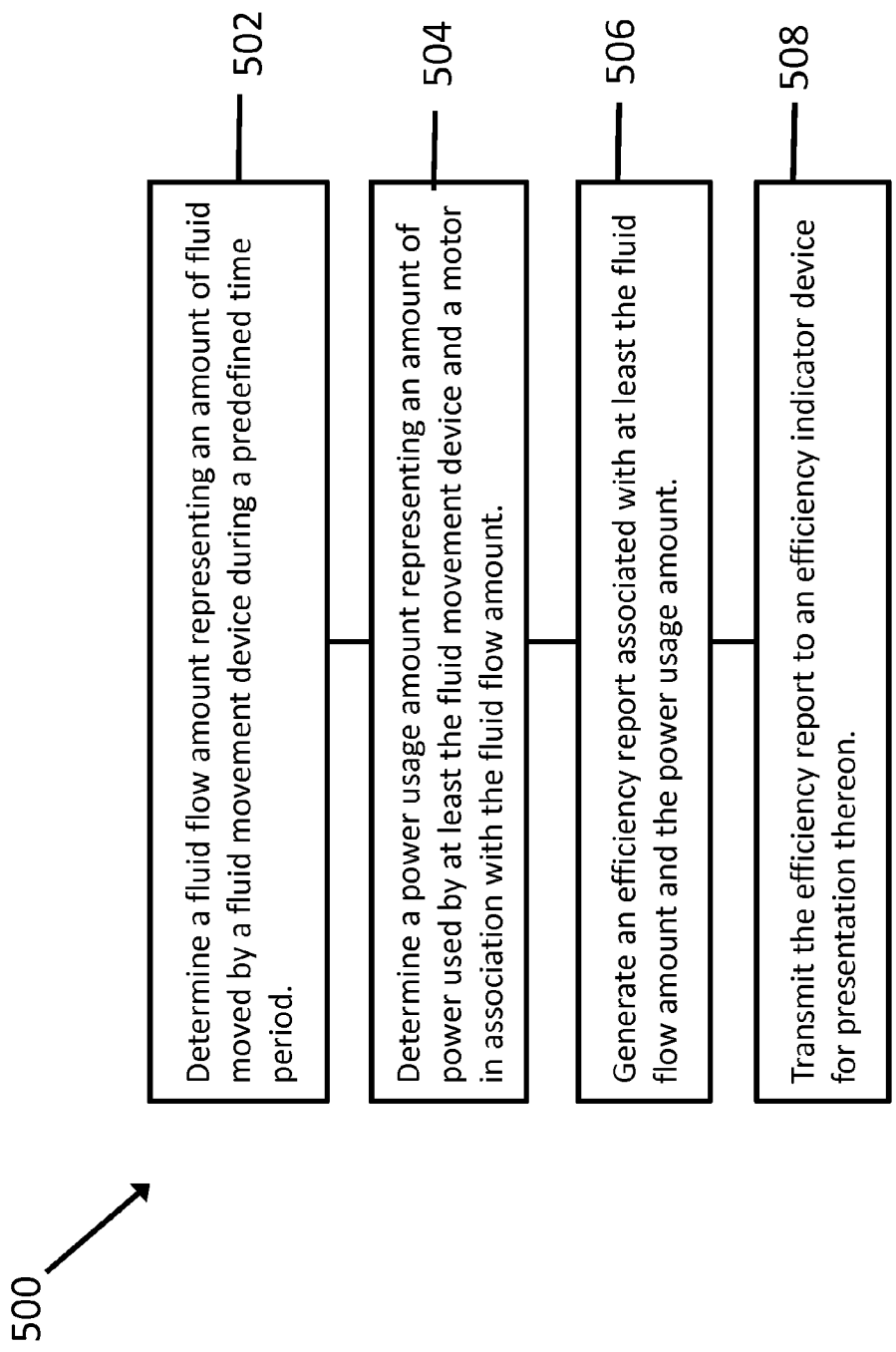
FIG. 5 is a flow chart of an example process performed by the motor controller of FIG. 1 in accordance with one aspect of the present disclosure.

FIG. 5 is a flow chart of an example process 500 performed by motor controller 102, and more specifically by efficiency determination computing device 120 included in motor controller 102. Initially, motor controller 102 determines 502 a fluid flow amount (e.g., fluid flow amount 316) representing an amount of fluid (e.g., an amount of cubic feet) moved by a fluid movement device (e.g., fluid movement device 106) during a predefined time period (e.g., one minute). Additionally, motor controller 102 determines 504 a power usage amount (e.g., power usage amount 318) representing an amount of power used by at least the fluid movement device (e.g., fluid movement device 106) and a motor (e.g., motor 104) in association with the fluid flow amount (e.g., fluid flow amount 316). Additionally, motor controller 102 generates 506 an efficiency report (e.g., first efficiency report 122) associated with at least the fluid flow amount (e.g., fluid flow amount 316) and the power usage amount (e.g., power usage amount 318). Additionally, motor controller 102 transmits 508 the efficiency report (e.g., first efficiency report 122) to an efficiency indicator device (e.g., first efficiency indicator device 124 and/or second efficiency indicator device 128) for presentation thereon.

In some implementations, motor controller 102, transmits the efficiency report (e.g., first efficiency report 122) while the motor (e.g., motor 104) is operating. In some implementations, motor controller 102 generates the efficiency report (e.g., first efficiency report 122) by calculating at least one of a first ratio (e.g., first ratio 306) of the fluid flow amount (e.g., fluid flow amount 316) to the power usage amount (e.g., power usage amount 318), a second ratio (e.g., second ratio 308) of a flow power amount (e.g., flow power amount 320) to the power usage amount (e.g., power usage amount 318), a third ratio (e.g., third ratio 310) of the fluid flow amount (e.g., fluid flow amount 316) to an energy usage amount (energy usage amount 322), and a flow resistance amount (e.g., resistance to flow 312) representing a resistance (e.g., resistance 114) of at least the fluid movement device (e.g., fluid movement device 106) to movement of the fluid.

In some implementations, motor controller 102 generates a plurality of efficiency reports including a first efficiency report (e.g., first efficiency report 122) and a second efficiency report (e.g., second efficiency report 404) and generates an average efficiency report (e.g., average efficiency report 402) by averaging the plurality of efficiency reports (e.g., first efficiency report 122 and second efficiency report 404). In some implementations, motor controller 102, generates a second efficiency report (e.g., second efficiency report 404) subsequent to the first efficiency report (e.g., first efficiency report 122), determines a change in efficiency (e.g., change in efficiency 412) by comparing the first efficiency report (e.g., first efficiency report 122) to the second efficiency report (second efficiency report 404), and transmits the change in efficiency (e.g., change in efficiency 412) to the efficiency indicator device (e.g., first efficiency indicator device 124 and/or second efficiency indicator device 128) for presentation thereon.

In some implementations, motor controller 102 causes the efficiency indicator device (e.g., first efficiency indicator device 124 and/or second efficiency indicator device 128) to illuminate in a pattern that represents the efficiency report (e.g., first efficiency report 122). In some implementations, motor controller 102 compares the efficiency report (e.g., first efficiency report 122) to at least one reference efficiency value (e.g., reference efficiency values section 610 of FIG. 6) stored in memory (e.g., memory 210) and based on the comparison, cause the efficiency indicator device (e.g., first efficiency indicator device 124 and/or second efficiency indicator device 128) to indicate that maintenance of at least one of the motor (e.g., motor 104) and the fluid movement device (e.g., fluid movement device 106) is required. For example, in some implementations, motor controller 102 causes first efficiency indicator device 124 and/or second efficiency indicator device 128 to display a message or illuminate in a color or pattern that indicates that at least one component (e.g., filter 115, inlet 110, and/or outlet 112) should be reconfigured, cleaned, or replaced. In some implementations, motor controller 102 transmits an instruction to client computing device 126 to display a web site of a manufacturer of filters (e.g., filter 115) to enable a user of fluid movement system 100 (e.g., a homeowner) to order one or more replacement filters from the manufacturer. In some implementations, a manufacturer of motor controller 102 partners with the manufacturer of the filters and the address of the web site is stored in memory 210 when motor controller 102 is manufactured.

In some implementations, motor controller 102 determines the power usage amount (e.g., power usage amount 318) by at least calculating a shaft power value associated with a torque and a speed of the motor (e.g., motor 104), for example as described with reference to FIG. 3. In some implementations, motor controller 102 determines the power usage amount (e.g., power usage amount 318) by retrieving at least one motor efficiency value from a lookup table (e.g., lookup table section 612 shown in FIG. 6) stored in memory (e.g., memory 210). In some implementations, motor controller 102 determines a torque of the motor (e.g., motor 104), determines a speed of the motor (e.g., motor 104), and determine the fluid flow amount (e.g., fluid flow amount 316) based on the torque of the motor (e.g., motor 104) and the speed of the motor (e.g., motor 104), for example as described with reference to FIG. 3. In some implementations, motor controller 102 is communicatively coupled to the efficiency indicator device (e.g., second efficiency indicator device 128) and motor controller 102 transmits the efficiency report (e.g., first efficiency report 122) to the efficiency indicator device (e.g., second efficiency indicator device 128) wirelessly (e.g., in output signal 132). In some implementations, motor controller 102 determines a peak power (e.g., peak power usage 304) used by at least one of the fluid movement device (e.g., fluid movement device 106) and the motor (e.g., motor 104) and a length of time in which the peak power was used (e.g., duration 314).

Figure 6:
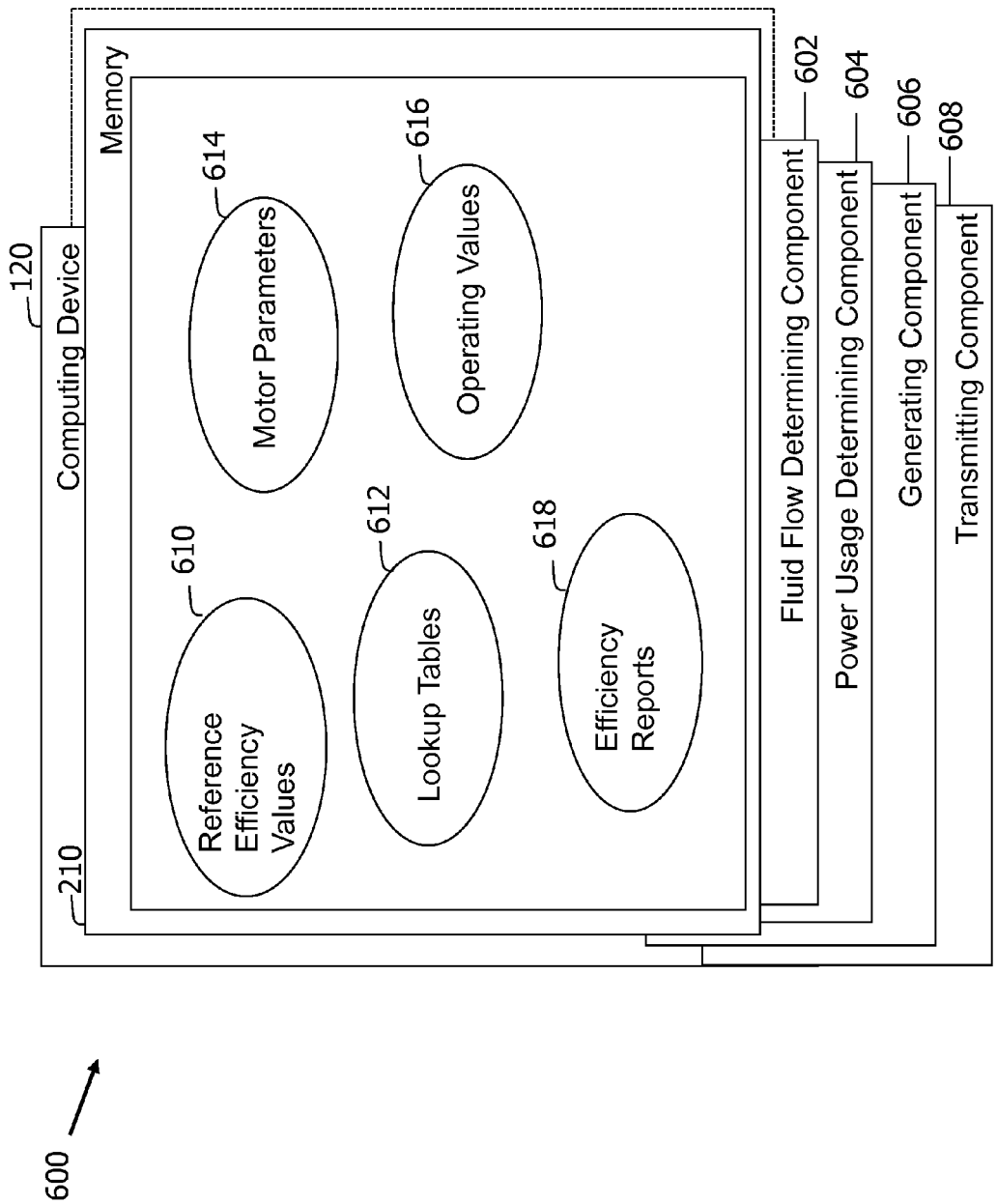
FIG. 6 is a diagram of components of one or more example computing devices that may be used in the fluid movement system shown in FIG. 1.

FIG. 6 is a diagram 600 of components of one or more example computing devices, for example, efficiency determination computing device 120, that may be used in embodiments of the described systems and methods. FIG. 6 further shows a configuration of data in memory 210. Memory 210 is coupled to several separate components within efficiency determination computing device 120, which perform specific tasks.

Efficiency determination computing device 120 includes a fluid flow determining component 602 for determining a fluid flow amount (e.g., fluid flow amount 316) representing an amount of fluid moved by a fluid movement device (e.g., fluid movement device 106) during a predefined time period. Additionally, efficiency determination computing device 120 includes a power usage determining component 604 for determining a power usage amount (e.g., power usage amount 318) representing an amount of power used by at least the fluid movement device (e.g., fluid movement device 106) and a motor (e.g., motor 104) in association with the fluid flow amount (e.g., fluid flow amount 316). Additionally, efficiency determination computing device 120 includes a generating component 606 for generating an efficiency report (e.g., first efficiency report 122) associated with at least the fluid flow amount (e.g., fluid flow amount 316) and the power usage amount (e.g., power usage amount 318). Additionally, efficiency determination computing device 120 includes a transmitting component 608 for transmitting the efficiency report (e.g., first efficiency report 122) to an efficiency indicator device (e.g., first efficiency indicator device 124 and/or second efficiency indicator device 128) for presentation thereon.

In an example embodiment, data in memory 210 is divided into a plurality of sections, including but not limited to, a reference efficiency values section 610, a lookup tables section 612, a motor parameters section 614, an operating values section 616, and an efficiency reports section 618. These sections within memory 210 are interconnected to retrieve and store information in accordance with the functions and processes described above.

The methods and systems described herein may be implemented using computer programming or engineering techniques including computer software, firmware, hardware or any combination or subset thereof, wherein the technical effect may include at least one of: (a) determining a fluid flow amount representing an amount of fluid moved by a fluid movement device during a predefined time period; (b) determining a power usage amount representing an amount of power used by at least the fluid movement device and a motor in association with the fluid flow amount; (c) generating an efficiency report associated with at least the fluid flow amount and the power usage amount; and (d) transmitting the efficiency report to an efficiency indicator device for presentation thereon.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for determining an efficiency of a fluid movement system that require detailed analysis of the fluid movement system in a specialized facility, such as a laboratory, the systems and methods described herein enable a fluid movement system to conveniently report efficiency information to a technician or user of the system in the field. Accordingly, systems and methods described herein (i) reduce the time and expense normally associated with determining the efficiency of a fluid movement system and (ii) enable a person to see how changes to the configuration of the fluid movement system impact the efficiency.

Exemplary embodiments of systems and methods for determining and indicating an efficiency of a fluid movement system are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller coupled to an efficiency indicator device and to a motor that is coupled to a fluid movement device, said motor controller comprising a processor, said motor controller configured to:

determine a fluid flow amount representing an amount of fluid moved by the fluid movement device during a predefined time period, the fluid flow amount determined based on a feedback signal received from the motor including a speed measurement and a torque measurement of the motor;

determine a power usage amount representing an amount of power used by at least the fluid movement device and the motor in association with the fluid flow amount, the power usage amount determined based on a voltage applied to the motor by said motor controller and a bus current measured by a current sensor within said motor controller;

calculate at least one efficiency parameter of the motor based on the determined fluid flow amount and the determined power usage amount;

generate an efficiency report including the calculated at least one efficiency parameter of the motor; and display the efficiency report on the efficiency indicator device.

2. The motor controller of claim 1, further configured to transmit the efficiency report while the motor is operating.

3. The motor controller of claim 1, further configured to generate the efficiency report by calculating at least one of a first ratio of the fluid flow amount to the power usage amount, a second ratio of flow power amount to the power usage amount, a third ratio of the fluid flow amount to an energy usage amount, and a flow resistance amount representing a resistance of at least the fluid movement device to movement of the fluid.

4. The motor controller of claim 3, wherein the efficiency report is a first efficiency report, and said motor controller is further configured to:

generate a plurality of efficiency reports including the first efficiency report and at least a second efficiency report subsequent to the first efficiency report; and generate an average efficiency report by averaging the plurality of efficiency reports.

5. The motor controller of claim 3, wherein the efficiency report is a first efficiency report, and said motor controller is further configured to:

generate a second efficiency report subsequent to the first efficiency report;

determine a change in efficiency by comparing the first efficiency report to the second efficiency report; and transmit the change in efficiency to the efficiency indicator device for presentation thereon.

6. The motor controller of claim 1, further configured to cause the efficiency indicator device to illuminate in a pattern that represents the efficiency report.

7. The motor controller of claim 1, further comprising a memory coupled to said processor, said motor controller further configured to:

compare the efficiency report to at least one reference efficiency value stored in said memory; and based on the comparison, cause the efficiency indicator device to indicate that maintenance of at least one of the motor and the fluid movement device is required.

8. The motor controller of claim 1, further comprising a memory coupled to said processor, said motor controller further configured to:

compare the efficiency report to at least one reference efficiency value stored in said memory; and based on the comparison, cause the efficiency indicator device to indicate that a filter should be replaced.

9. The motor controller of claim 1, further configured to determine the power usage amount by at least calculating a shaft power value associated with a torque and a speed of the motor.

10. The motor controller of claim 1, further comprising a memory, said motor controller further configured to determine the power usage amount by retrieving at least one motor efficiency value from a lookup table stored in said memory.

11. The motor controller of claim 1, further configured to:
determine a torque of the motor;
determine a speed of the motor; and
determine the fluid flow amount based on the torque of the motor and the speed of the motor.

12. The motor controller of claim 1, wherein said motor controller is communicatively coupled to the efficiency indicator device, and said motor controller is further configured to transmit the efficiency report to the efficiency indicator device wirelessly.

13. The motor controller of claim 1, wherein said motor controller is further configured to determine a peak power used by at least one of the fluid movement device and the motor and a length of time in which the peak power was used.

14. The motor controller of claim 1, wherein said motor controller is further configured to transmit an instruction to a client computing device to display a web site that enables a user to order at least one replacement filter.

15. A method for indicating an efficiency of a fluid movement system that includes a motor controller coupled to an efficiency indicator device and to a motor that is coupled to a fluid movement device, said method is implemented by the motor controller, said method comprising:

determining, by the motor controller, a fluid flow amount representing an amount of fluid moved by the fluid movement device during a predefined time period, the fluid flow amount determined based on a feedback signal received from the motor including a speed measurement and a torque measurement of the motor;

determining, by the motor controller, a power usage amount representing an amount of power used by at least the fluid movement device and the motor in association with the fluid flow amount, the power usage amount determined based on a voltage applied to the motor by the motor controller and a bus current measured by a current sensor within the motor controller;

calculating, by the motor controller, at least one efficiency parameter of the motor based on the determined fluid flow amount and the determined power usage amount;

generating, by the motor controller, an efficiency report including the calculated at least one efficiency parameter of the motor; and displaying, by the motor controller, the efficiency report on the efficiency indicator device.

16. The method of claim 15, wherein transmitting the efficiency report further comprises transmitting the efficiency report while the motor is operating.

17. The method of claim 15, wherein generating the efficiency report further comprises calculating at least one of a first ratio of the fluid flow amount to the power usage amount, a second ratio of flow power amount to the power usage amount, a third ratio of the fluid flow amount to an energy usage amount, and a flow resistance amount representing a resistance of at least the fluid movement device to movement of the fluid.

18. The method of claim 17, wherein the efficiency report is a first efficiency report, said method further comprising:

generating a plurality of efficiency reports including the first efficiency report and at least a second efficiency report subsequent to the first efficiency report; and generating an average efficiency report by averaging the plurality of efficiency reports.

19. The method of claim 17, wherein the efficiency report is a first efficiency report, said method further comprising:

generating a second efficiency report subsequent to the first efficiency report;

determining a change in efficiency by comparing the first efficiency report to the second efficiency report; and transmitting the change in efficiency to the efficiency indicator device for presentation thereon.

20. A computer-readable storage device having computer-executable instructions embodied thereon, wherein when executed by a motor controller coupled to an efficiency indicator device and to a motor that is coupled to a fluid movement device, said computer-executable instructions cause the motor controller to:

determine a fluid flow amount representing an amount of fluid moved by the fluid movement device during a predefined time period, the fluid flow amount determined based on a feedback signal received from the motor including a speed measurement and a torque measurement of the motor;

determine a power usage amount representing an amount of power used by at least the fluid movement device and the motor in association with the fluid flow amount, the power usage amount determined based on a voltage applied to the motor by said motor controller and a bus current measured by a current sensor within said motor controller;

calculate at least one efficiency parameter of the motor based on the determined fluid flow amount and the determined power usage amount;

generate an efficiency report including the calculated at least one efficiency parameter of the motor; and display the efficiency report on the efficiency indicator device.

* * * * *